(12) United States Patent
Potucek et al.

(10) Patent No.: US 6,931,302 B1
(45) Date of Patent: Aug. 16, 2005

(54) METHOD FOR A ROBOT

(75) Inventors: Igor Potucek, Vasteras (SE); Staffan Ellqvist, Vasteras (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 09/889,171

(22) PCT Filed: Jan. 13, 2000

(86) PCT No.: PCT/SE00/00043

§ 371 (c)(1),
(2), (4) Date: Sep. 13, 2001

(87) PCT Pub. No.: WO00/41852

PCT Pub. Date: Jul. 20, 2000

(30) Foreign Application Priority Data

Jan. 15, 1999 (SE) .................................... 9900123

(51) Int. Cl.[7] .............................................. G07F 7/00
(52) U.S. Cl. .................... 700/218; 700/217; 700/214; 700/259
(58) Field of Search ............................... 700/214, 217, 700/218, 259

(56) References Cited

U.S. PATENT DOCUMENTS

| 4,409,650 A | * | 10/1983 | Noguchi ..................... 364/193 |
|---|---|---|---|
| 4,419,831 A | | 12/1983 | Zimmer |
| 4,806,066 A | | 2/1989 | Rhodes et al. |
| 4,816,955 A | | 3/1989 | Bruns et al. |
| 4,833,624 A | * | 5/1989 | Kuwahara et al. .......... 364/513 |
| 4,969,108 A | * | 11/1990 | Webb et al. ................ 364/513 |
| 4,987,356 A | * | 1/1991 | Yamada et al. ............ 318/578 |
| 5,194,791 A | * | 3/1993 | Cull ........................ 318/568.1 |
| 5,276,777 A | * | 1/1994 | Hara .......................... 395/87 |
| 5,314,722 A | * | 5/1994 | Kobayashi .................. 427/425 |
| 5,457,367 A | * | 10/1995 | Thorne .................. 318/568.11 |
| 5,565,749 A | * | 10/1996 | Jinno et al. ................ 318/566 |
| 5,838,882 A | * | 11/1998 | Gan et al. ..................... 395/94 |
| 5,840,595 A | * | 11/1998 | Kobayashi ................... 438/16 |
| 5,878,151 A | * | 3/1999 | Tang et al. ................ 382/103 |
| 5,905,850 A | * | 5/1999 | Kaveh ......................... 395/94 |
| 6,405,101 B1 | * | 6/2002 | Johanson et al. ........... 700/218 |
| 6,411,386 B1 | * | 6/2002 | Nishi ......................... 356/401 |
| 6,453,214 B1 | * | 9/2002 | Bacchi et al. .............. 700/245 |
| 6,591,160 B2 | * | 7/2003 | Hine et al. ................. 700/218 |
| 6,721,625 B2 | * | 4/2004 | Mehlberg et al. .......... 700/218 |
| 6,825,485 B1 | * | 11/2004 | Mehlberg .............. 250/559.29 |

FOREIGN PATENT DOCUMENTS

GB            0 166 002           1/1986

* cited by examiner

Primary Examiner—Donald P. Walsh
Assistant Examiner—Michael Butler
(74) Attorney, Agent, or Firm—Venable LLP; Eric J. Franklin

(57) ABSTRACT

Method for synchronizing a robot where a target is arranged on the movable part of the robot at the respective robot axles. The movable part rotates back and forth and at the same time a sensor reads at least two distinct detectable changes on the target. The center-point for the target is calculated and introduced into the control system.

15 Claims, 4 Drawing Sheets

METHOD FOR A ROBOT

TECHNICAL FIELD

The present invention relates to method for, a device for, and the use of positional measurement during the synchronising of a robot.

BACKGROUND

During operation, an industrial robot has to meet high requirements regarding precision and accuracy. The industrial robot carries out defined reproducible movements over a program-controlled linkage system driven by means of electric motors. The dimensions of the movement of the individual driving groups is controlled and supervised by an electronic path-measurement system. The zero positions of the driving system and the path-measurement system must correspond and be set to correspond again should deviations occur. An industrial robot thus has a need for a device for the exact and reproducible setting of the motor-driven linkage system of the robot. It is necessary to calibrate a robot to fulfil the demands for precision and accuracy named above and, following periods of stoppage of production and after service, it is necessary to synchronise the robot in order to meet the demands named above.

Here, calibration refers to initiating a configuration of a robot at start-up. The aim is to find the exact configuration (zero-position/calibration position) of the robot at the time when turning on the power and initiate the verifying part of the control system accordingly.

Here, synchronisation refers to checking or setting the robot to the zero-position/calibration position following service stops (e.g. replacing a motor), stoppages of production, collision and the like.

Industrial robots working with high accuracy are equipped with servo-controlled motors. To check a motor, a sensor has to measure the exact position of the angle of the motor axle in real time. In servo motors, positional information together with angular speed is used in a feedback system to clear differences between predetermined and actual positions. Positional information cannot be used to check the robot if the measurements do not reflect the actual position of the robot. The goal of calibration is thus to initiate measurements of its "true/real" values.

When working with industrial robots, the need thus arises for a method for positional measuring to be used when calibrating and synchronising a robot.

The American document U.S. Pat. No. 4,419,831 specifies a device that allows calibration of a linkage system that can be brought to correspond accurately with the calibration of an electronic path-measuring system even after replacement of parts of the drive or path-measuring system respectively. In a moveable part of two associated linkage parts, a recess or an elevation is arranged, and in an associated second linkage part, a guide for a measuring sensor instrument is adjustably and fixably arranged, where the sensing element of the instrument indicates the calibration position/zero-position during relative movement of both the linkage parts by determining the minimum respectively maximum of the recess or elevation. The object of the measurement method is to get the possibility to use the same program following replacement of measuring system or manipulator.

Service stops and other shut-downs mean disturbance of production lines and non-production, which leads to large and unwanted costs. It is thus of greatest importance that the time for shut-downs is minimised. Since the robot must be calibrated/synchronised after every stoppage, it is important that this is carried out quickly. At the same time, it is of greatest importance that the method is simple, accurate and has good reproducibility. Thus, the need arises for an accurate, simple and quick method for positional measuring.

This need cannot be met by the method in the American patent.

SUMMARY OF THE INVENTION

A robot system includes several partial systems, among others manipulator and control system. The manipulator is defined as the linkage arms, joints, transmissions and driving means that are included in the mechanical arm. The control system generates movements of the manipulator by servo-steering of the individual driving means as well as defined movements through a control and interpolation model of the physical construction of the manipulator. In the following, the term "robot" relates to a robot system including, among other things, manipulator and control system as defined above.

During manufacture, the robot is provided with a computer program that includes stored co-ordinates that correspond to pre-programmed points in the surrounding space. The robot is designed so that an operator can press a key on a keyboard whereby signals go to the different parts of the robot and direct them to take up the pre-determined positions and adjust themselves accordingly. This can be described as the robot being configured to its zero position/calibration position.

The robot is configured to the calibration position as above. Then the robot is calibrated with, for example, an external method that gives calibration values for respective rotation axle, which comprise reference values that are fed into the control system and stored.

To fulfil the demands named above for an accurate position measuring of the robot, a first robot part is provided with a physical target. A second robot part movably attached at the first robot part includes a sensor. The movement between the robot parts is translational or rotational. The position of the target is detected with the help of the sensor, which gives the offset angle a.

An installed robot thus has a calibration value and an offset angle a stored for the respective axis of rotation. The robot can be started and driven until it for some reason is stopped/stops. When necessary actions have been taken and it is time to start the robot again, the synchronising position of the robot must be checked. This means that the calibration program is run, the robot adjusts itself to its zero position/calibration position and the position of the target is measured for the respective axis, an angle da is calculated and compared with the stored offset angle a.

The difference d between the angle da measured and the offset angle a is calculated and presented as the offset of TCP (Tool Centre Point). The calculated difference d is shown on the screen of a programming controller. The value of d is shown graphically on the screen and is compared with a pre-determined limit value. When the value of the difference lies under the limiting value, the robot is ready for operation. However, when the value of the difference exceeds the limit value, it means that the configuration of the robot no longer corresponds to the stored calibration values. In that situation, it is necessary to begin again by configuring and calibrating the robot with, for example, an external method to obtain new calibration values for the zero position. After that, one continues by measuring new offset angle a and so one according to that above.

The object of the present invention is thus to achieve a method with which one can quickly, simply and with great accuracy synchronise a robot.

The solution according to the invention is to arrange a physical target on the moveable part of the robot at the respective robot axles and during displacement of the moving part back and forth, read at least two by the movement separate and distinct positions of the target with a transmitter, calculate the centre position/mean value and introduce the value into the control system.

The term robot axle relates to the moving axles of the robot for one CL the rotation or translation movements.

In the cited American document, the target is designed either as a V-shaped depression or elevation and the transmitter measures the equivalent minimum or maximum points. The designing of the target as a point involves certain disadvantages. A point is easy to damage. The contact transmitter and further handling of axles results in a certain wear of the point, which has a detrimental effect on the accuracy. In addition, the possibility for positionally measuring a target during translational movement is not stated.

Measuring the position of a point with a contact transmitter is difficult with regard to the techniques of measurement. A point has two flanks and with a contact transmitter, problems of sliding occur along one of the flanks irrespective of whether it is an elevation or a depression. A contact transmitter, which reads the position of the point of a pointed target as it passes the transmitter back and forth displays a value with built-in errors in measurement due to the difficulty partly in following the surface of the point and partly in deciding exactly where the point is located. A more blunted point reduces the problem of sliding but does not give such a clear point position to sense.

To measure the position of a point with a non-contact transmitter requires an expensive and complicated transmitter to achieve reliable measurement results. In addition, high demands on precision are made in the designing of the point, which leads to extra costs. Furthermore, the transmitter should have a comparatively larger field of reading to be able to read a point. The transmitter thus requires space in an already very tight and compact design.

To minimise the disadvantages named above, the present invention is arranged with targets designed with two or more distinct detectable changes. In the embodiment described below, the target is designed as a milled groove. A milled groove is built up of at least two step-like level differences in the form of shoulder parts.

To measure the position of a shoulder part with a non-contact transmitter is easy with regard to the techniques of measurement. Shoulder parts have step-like and transverse level changes that are easy to register with comparatively simple and cheap transmitters. Even with a contact transmitter, it is easy to measure the position of a shoulder part, which gives an instantaneous level change.

When the position for a groove is to be read and the shoulder parts of the groove pass back and forth in front of the transmitter, the transmitter reads the position of two opposite shoulder parts at each pass. In one measuring position, the level change is ascending and in the other measuring position, the level change is descending. From a techniques of measurement point of view, there are errors in measurement included in all measuring equipment, By reading two positions and calculating the centre position according to the invention, the error of measuring decreases and the accuracy of measurement increases. The groove is arranged so that its walls extend in a direction at right angles to the direction of motion both during translational and rotational movement. The accuracy of measurement decreases if the direction of the walls of the groove does not form a right angle with the direction of motion.

Designing the target as a milled groove in accordance with the invention is furthermore simpler, cheaper and does not call for the same demands for precision in comparison with the pointed target in the American patent document. A milled groove resists wear in a very satisfactory manner. Another practical advantage is that the grooves of the respective axles need not be identical.

DESCRIPTION OF THE DRAWING

The invention will be explained in greater detail by describing an example of an embodiment with reference to the enclosed drawing, where.

DESCRIPTION OF EMBODIMENTS

Figure 1:
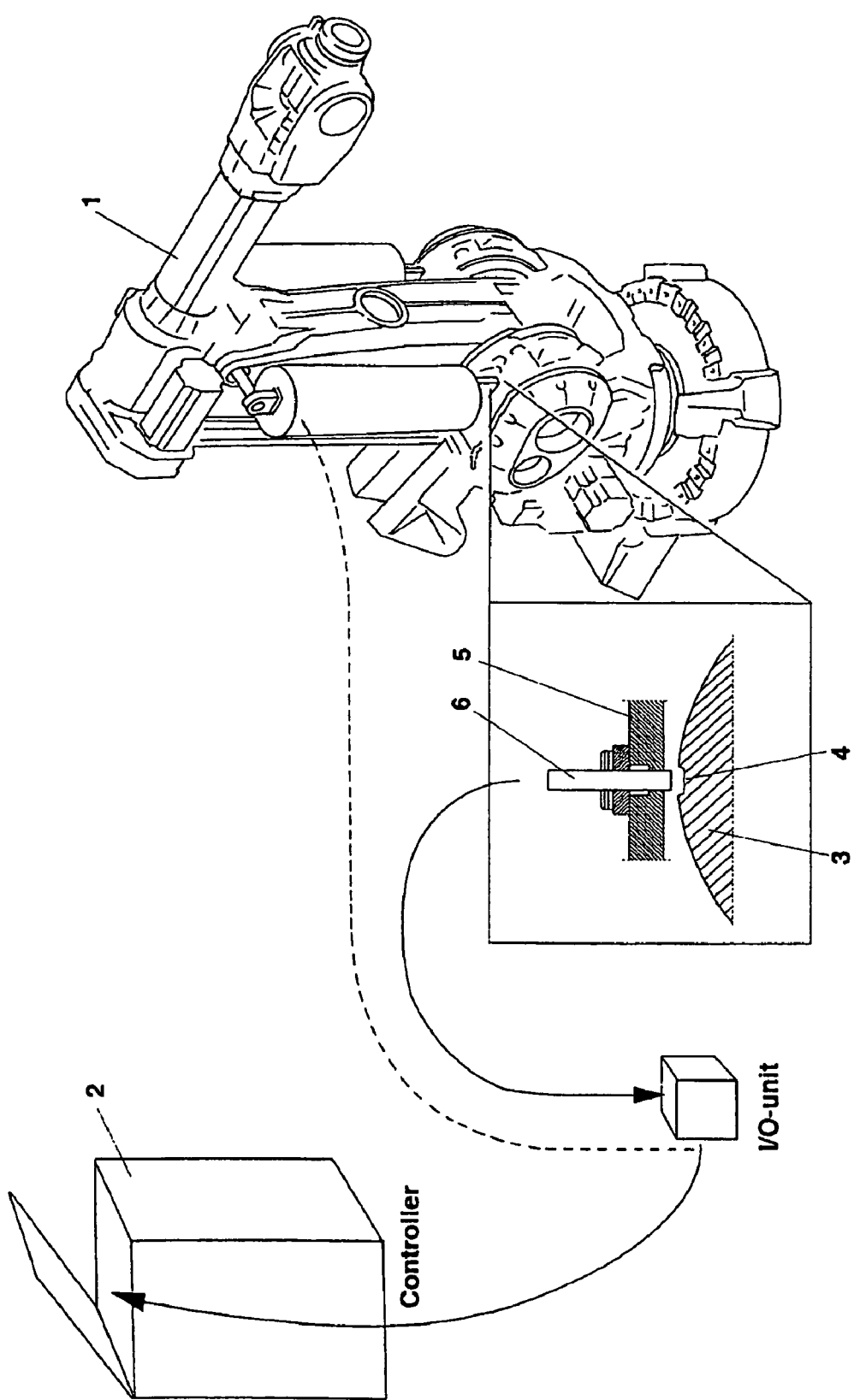
FIG. 1 shows an industrial robot including a control system.
Figure 2:
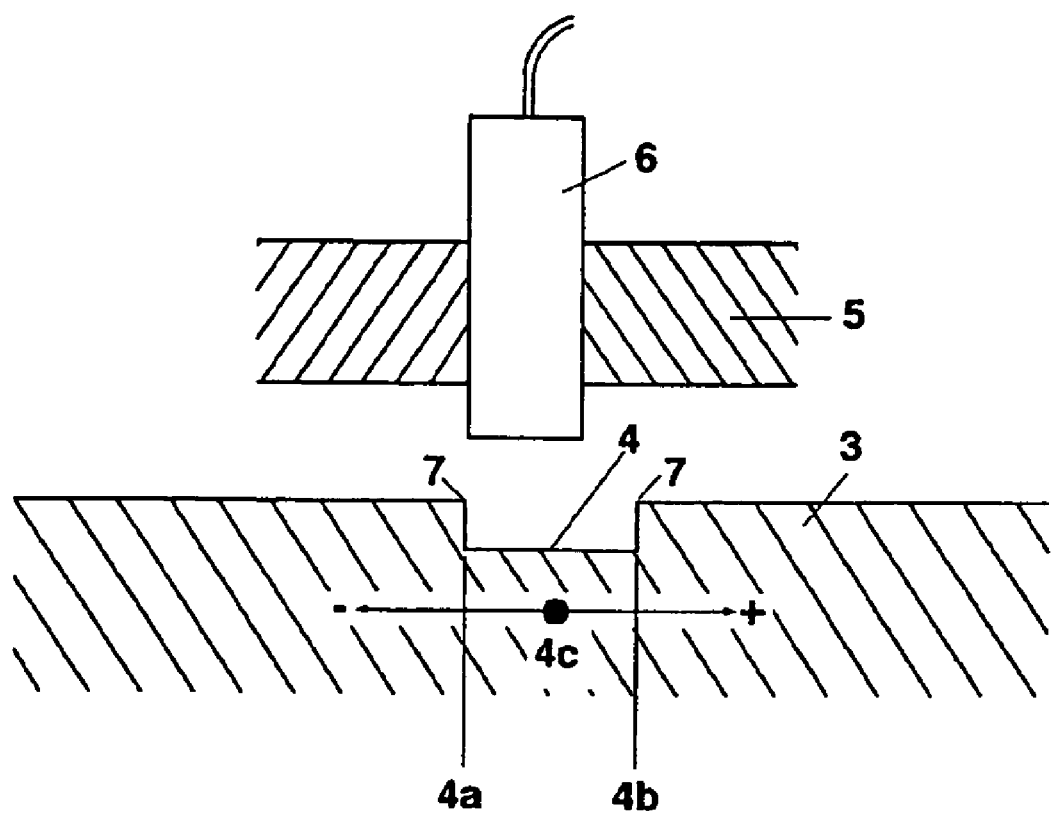
FIG. 2 shows a target in the form of a groove with two distinct delimiters plus a transmitter.
Figure 3:
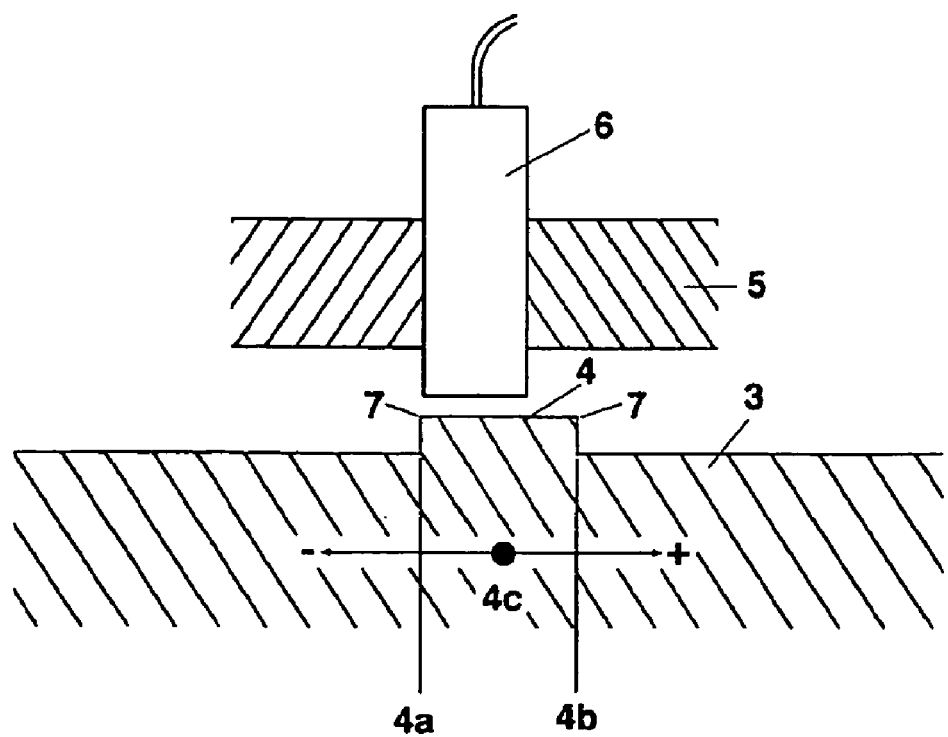
FIG. 3 shows a target in the form of an elevation with two distinct delimiters plus a transmitter.

An industrial robot 1 is equipped with a control system 2 (FIG. 1). The movable part 3 of the robot 1 is provided on the respective robot axle with a physical target 4 and on the part 5 accommodating the equivalent robot axle, a sensor 6 is arranged. The target 4 comprises a milled groove that has two essentially vertical walls, 4a and 4b. The grove is designed with two sharp level differences in the form of shoulder parts 7 (FIG. 2).

The device aims, as above, to check/measure a determined position 4c of target 4 on the moving part 3 of robot 1 in relation to a calibration value for the respective robot axle. By running a computer program for calibration fed into the control system, the program will instruct the moving part 3 to pass sensor 6 in one or the other direction of rotation at the same time as the sensor senses the position of the target by detecting the position of the two distinct detectable changes 4a and 4b, calculate the centre-point 4c between the two changes and generate a mean value of an angle, the offset angle a (FIG. 4).

Figure 4:
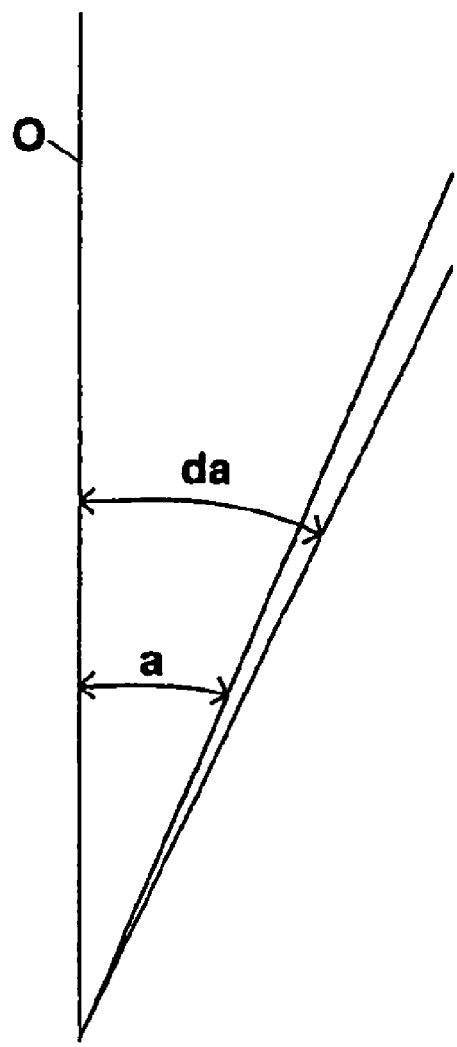
FIG. 4 shows a graphical reproduction of the measured angles (a) and (da) in relation to the zero-position/calibration position.

FIG. 4 shows the calibration position/zero position 0 and the offset angle a. It also shows an angle da, measured as above, that is larger than the offset angle a. A difference between the measured angle da and the offset angle a means that something has happened with the configuration of the robot. Included finally, therefore, is to evaluate if this difference is acceptable or not, which is already described in the summary of the invention.

When the robot is calibrated or alternately synchronised, the calibration of all axles takes place one at a time. Alternatively, one can consider calibrating all at the same time.

ALTERNATIVE EMBODIMENTS

The device according to the invention can also be designed with the target arranged on the part that accommodates the robot axle and with the transmitter arranged on the moving part in the respective robot axle.

When evaluating whether the difference d is acceptable or not, the evaluation can be programmed into the control system so that the evaluation is done automatically. Either the go-ahead to start the robot will be given or the order to recalibrate it.

Instead of having permanent sensors at every robot axle, one can instead arrange a space, e.g. an opening to hang a separate sensor in.

The sensor can either be a contact sensor or a non-contact sensor.

The target can also be an elevation with at least two essentially vertical sides.

The distinct detectable changes of the target can comprise several step-like structural changes.

The moving part in the respective robot axle can, during the positional measuring, be displaced only in one direction. In this case, the measuring still gives almost an equivalent result as when the movable part is displaced back and forth.

What is claimed is:

1. A device for synchronizing a robot that includes a control system, a first robot part and a second robot part movably attached to the first robot part, the device comprising:
    a target arranged on the first robot part; and
    a sensor arranged on the second robot part,
    wherein the target includes several distinct detectable changes comprising height transitions, said height transitions being defined by sharp level differences in surfaces of said first robot part and comprising walls or sides, said height transitions comprising instantaneous level differences in the form of shoulder parts, said sensor sensing at least two of said distinct detectable changes at said respective height transitions to thereby enable the synchronizing of said robot by calculating a position of the target by calculating a center-point of adjacent height transitions.

2. The device according to claim 1, wherein the sensor comprises a non-contact sensor.

3. The device according to claim 1, wherein the sensor comprises a contact sensor.

4. A device for synchronizing a robot that includes a control system, a first robot part and a second robot part movably attached to the first robot part, the device comprising:
    a target arranged on the first robot part; and
    a sensor arranged on the second robot part,
    wherein the target includes several distinct detectable changes comprising height transitions, said height transitions being defined by sharp level differences in surfaces of said first robot part and comprising a groove with walls, said sensor sensing at least two of said distinct detectable changes at said respective height transitions to thereby enable the synchronizing of said robot by calculating a position of the target by calculating a center-point of adjacent height transitions.

5. The device according to claim 4, wherein the sensor comprises a non-contact sensor.

6. The device according to claim 4, wherein the sensor comprises a contact sensor.

7. A device for synchronizing a robot that includes a control system, a first robot part and a second robot part movably attached to the first robot part, the device comprising:
    a target arranged on the first robot part; and
    a sensor arranged on the second robot part,
    wherein the target includes several distinct detectable changes comprising height transitions, said height transitions being defined by sharp level differences in surfaces of said first robot part and comprising an elevation with sides, said sensor sensing at least two of said distinct detectable changes at said respective height transitions to thereby enable the synchronizing of said robot by calculating a position of the target by calculating a center-point of adjacent height transitions.

8. The device according to claim 7, wherein the sensor comprises a non-contact sensor.

9. The device according to claim 7, wherein the sensor comprises a contact sensor.

10. A device for synchronizing a robot that includes a control system, a first robot part and a second robot part movably attached to the first robot part, the device comprising:
    a target arranged on the first robot part; and
    a sensor arranged on the second robot part,
    wherein the target includes height transitions comprising at least one of sides and walls, level differences in respective surfaces of said sides or walls defining distinct detectable structural changes in surfaces of said first robot part, the structural changes comprising instantaneous level differences in the form of shoulder parts, said sensor sensing at least two of said distinct detectable changes at said respective structural changes to thereby enable the synchronizing of said robot by calculating a position of the target by calculating a center-point of adjacent structural changes.

11. The device according to claim 10, wherein the sensor comprises a non-contact sensor.

12. The device according to claim 10, wherein the sensor comprises a contact sensor.

13. A device for synchronizing a robot that includes a control system, a first robot part and a second robot part movably attached to the first robot part, the device comprising:
    a target arranged on the first robot part; and
    a sensor arranged on the second robot part,
    wherein the target includes height transitions comprising an elevation with sides, level differences in respective surfaces of said sides or walls defining distinct detectable structural changes in surfaces of said first robot part, said sensor sensing at least two of said distinct detectable changes at said respective structural changes to thereby enable the synchronizing of said robot by calculating a position of the target by calculating a center-point of adjacent structural changes.

14. The device according to claim 13, wherein the sensor comprises a non-contact sensor.

15. The device according to claim 13, wherein the sensor comprises a contact sensor.

* * * * *